United States Patent
Pau (10) Patent No.: US 9,258,564 B2
(45) Date of Patent: Feb. 9, 2016

(54) VISUAL SEARCH SYSTEM ARCHITECTURES BASED ON COMPRESSED OR COMPACT FEATURE DESCRIPTORS

(71) Applicant: STMicroelectronics S.r.l., Agrate Brianza (IT)

(72) Inventor: Danilo Pietro Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 13/762,349

(22) Filed: Feb. 7, 2013

(65) Prior Publication Data

US 2013/0216135 A1    Aug. 22, 2013

Related U.S. Application Data

(60) Provisional application No. 61/596,142, filed on Feb. 7, 2012, provisional application No. 61/596,111, filed on Feb. 7, 2012, provisional application No. 61/596,149, filed on Feb. 7, 2012.

(51) Int. Cl.
*G06K 9/46* (2006.01)
*H04N 19/124* (2014.01)
*G06K 9/00* (2006.01)
(Continued)

(52) U.S. Cl.
CPC .......... *H04N 19/124* (2014.11); *G06K 9/00523* (2013.01); *G06K 9/00671* (2013.01); *G06K 9/46* (2013.01); *G06K 9/4671* (2013.01); *G06K 9/6218* (2013.01); *H04N 7/26079* (2013.01); *H04N 19/13* (2014.11); *H04N 19/91* (2014.11)

(58) Field of Classification Search
USPC .......... 382/190, 197, 203, 233, 236, 100, 173, 382/250, 248, 298; 707/728, 748; 348/387, 348/390, 403, 411
See application file for complete search history.

(56) References Cited

U.S. PATENT DOCUMENTS 5,325,445 A * 6/1994 Herbert ................ G06K 9/6282
382/225
5,867,386 A * 2/1999 Hoffberg .............. G06F 3/0482
382/190

(Continued)

OTHER PUBLICATIONS

David G. Lowe, "Distinctive Image Features from Scale-Invariant Keypoints," International Journal of Computer Vision, Jan. 5, 2004, pp. 1-28, vol. 60, No. 2, University of British Columbia, Computer Science Department, Vancouver, B.C., Canada.

(Continued)

*Primary Examiner* — Vu Le
*Assistant Examiner* — Aklilu Woldemariam
(74) *Attorney, Agent, or Firm* — Seed IP Law Group PLLC (57) ABSTRACT

An embodiment of a visual search system includes at least one imaging device, each imaging device operable to capture a corresponding image, a feature extraction device coupled to each imaging device, each feature extraction device operable to generate feature descriptors from the image received from the corresponding imaging device. A descriptor encoding device is coupled to each feature extraction device and operable to generate compressed feature descriptors from the received feature descriptors. An application processor is coupled to each descriptor encoding device. The application processor is operable to process the received compressed feature descriptors to generate output information as a function of the processed compressed feature descriptors.

15 Claims, 7 Drawing Sheets

(51) Int. Cl.
G06K 9/62 (2006.01)
H04N 19/13 (2014.01)
H04N 19/91 (2014.01)

(56) References Cited

U.S. PATENT DOCUMENTS

| | | | |
|---|---|---|---|
| 6,411,724 B1* | 6/2002 | Vaithilingam | G06F 17/30038 382/100 |
| 6,618,507 B1* | 9/2003 | Divakaran | G06F 17/30811 382/236 |
| 6,646,676 B1* | 11/2003 | DaGraca | G06F 17/30805 340/541 |
| 6,711,293 B1 | 3/2004 | Lowe | |
| 6,778,708 B1* | 8/2004 | Divakaran | G06F 17/30811 348/699 |
| 6,968,006 B1* | 11/2005 | Puri | G06T 9/001 375/240.08 |
| 7,143,434 B1* | 11/2006 | Paek | G06F 17/30858 345/619 |
| 7,412,427 B2 | 8/2008 | Zitnick et al. | |
| 7,715,475 B1* | 5/2010 | Puri | H04N 19/70 375/240 |
| 8,031,768 B2 | 10/2011 | Wen | |
| 8,156,116 B2* | 4/2012 | Graham | G06F 17/30035 705/14.4 |
| 8,306,747 B1* | 11/2012 | Gagarin | G01C 7/04 701/408 |
| 8,447,767 B2* | 5/2013 | Ah-Pine | G06F 17/30023 706/54 |
| 8,467,570 B2 | 6/2013 | Ma et al. | |
| 2002/0102020 A1 | 8/2002 | Qian et al. | |
| 2008/0123959 A1 | 5/2008 | Ratner et al. | |
| 2008/0304563 A1 | 12/2008 | Schoenblum | |
| 2009/0290812 A1 | 11/2009 | Naaman et al. | |
| 2010/0226575 A1* | 9/2010 | Grzeszczuk | G06F 17/30256 382/190 |
| 2010/0310174 A1* | 12/2010 | Reznik | G06K 9/4642 382/190 |
| 2011/0052003 A1 | 3/2011 | Cobb et al. | |
| 2011/0274355 A1* | 11/2011 | Oami | G06F 17/30256 382/190 |
| 2012/0002868 A1 | 1/2012 | Loui et al. | |
| 2012/0013491 A1 | 1/2012 | Chen et al. | |
| 2012/0051425 A1 | 3/2012 | Chong et al. | |
| 2012/0109993 A1* | 5/2012 | Reznik | G06K 9/4671 707/765 |
| 2013/0016912 A1* | 1/2013 | Li | G06K 9/4671 382/197 |
| 2013/0216135 A1 | 8/2013 | Pau | |
| 2013/0216143 A1 | 8/2013 | Pasteris et al. | |
| 2014/0133550 A1 | 5/2014 | Pau | |
| 2014/0185949 A1 | 7/2014 | Pau et al. | |

OTHER PUBLICATIONS

Eric Bodden et al., "Arithmetic Coding Revealed: A Guided Tour from Theory to Praxis," McGill University School of Computer Science, Sable Research Group, May 25, 2007, pp. 1-60, Montreal, Quebec, Canada.
Vijay Chandrasekhar et al., "Compressed Histogram of Gradients: A Low-Bitrate Descriptor," International Journal on Computer Vision, May 15, 2011, pp. 1-16, vol. 94, No. 5, University of Stanford, USA.
"Call for Proposals for Compact Descriptors for Visual Search," Requirements Subgroup, International Organisation for Standardisation, Coding of Moving Pictures and Audio, ISO/IEC JTC1/SC29/WG11/N12201, Jul. 2011, Torino, IT, 5 pages.
"Description of Test Model under Consideration for CDVS," Video Subgroup, International Organisation for Standardisation, Coding of Moving Pictures and Audio, ISO/IEC JTC1/SC29/WG11/N12367, Francini et al. (eds.), Dec. 2011, Geneva, CH, 24 pages.
"Evaluation Framework for Compact Descriptors for Visual Search," International Organisation for Standardisation Coding of Moving Pictures and Audio, ISO/IEC JTC1/SC29/WG11/N12202, Jul. 2011, Torino, IT, 14 pages.

"Huffman coding," Wikipedia, retrieved from http://en.wikipedia.org/wiki/Huffman_coding, on Mar. 17, 2015, 11 pages.
"Low-voltage differential signaling," Wikipedia, retrieved from http://en.wikipedia.org/w/index.php?title=Low-voltage_differential_signaling&printable=yes, on Mar. 18, 2015, 7 pages.
Bay et al., "SURF: Speeded Up Robust Features," $9^{th}$ European Conference on Computer Vision, May 7-13, 2006, Graz, Austria, pp. 404-417.
Brasnett, et al., "A Robust Visual Identifier Using the Trace Transform," Visual Information Engineering Conference 2007, 6 pages.
Calonder et al., "BRIEF: Binary Robust Independent Elementary Features," $11^{th}$ European Conference on Computer Vision, Sep. 5-11, 2010, Heraklion, Crete, Greece, pp. 778-792.
Chandrasekhar et al., "Comparison of Local Feature Descriptors for Mobile Visual Search," $17^{th}$ IEEE International Conference on Image Processing, Sep. 26-29, 2010, Hong Kong, pp. 3885-3888.
Chandrasekhar et al., "Survey of SIFT Compression Schemes," *Proc. Int. Workshop Mobile Multimedia Processing*, 2010, 8 pages.
Chandrasekhar et al., "Transform Coding of Image Features Descriptors," *Proc. SPIE7257*, Visual Communications and Image Processing, Jan. 18, 2009, San Jose, CA, 725710, 9 pages.
Ertöz et al., "Finding Clusters of Different Sizes, Shapes, and Densities in Noisy, High Dimensional Data," SIAM International Conference on Data Mining—SDM, 2003, 12 pages.
Euro NCAP Advanced Rewards, retrieved from http://www.euroncap.com/en/ratings-rewards/euro-ncap-advanced-rewards/, on Mar. 18, 2015, 2 pages.
Fischler et al., "Random Sample Consensus: A Paradigm for Model Fitting with Applications to Image Analysis and Automated Cartography," *Communications of the ACM 24(6)*:381-395, Jun. 1981.
Girod et al., "Mobile Visual Search IEEE Signal Processing Magazine," [61] Jul. 2011, 16 pages.
Hess, "SIFT Library," retrieved from http://blogs.oregonstate.edu/hess/code/sift/, on Mar. 18, 2015, 3 pages.
Jégou et al., "Product quantization for nearest neighbor search," *IEEE Transactions on Pattern Analysis and Machine Intelligence 33(1)*:117-128, Mar. 18, 2010.
Ke et al., "PCA-SIFT: A More Distinctive Representation for Local Image Descriptors," IEEE Computer Society Conference on Computer Vision and Pattern Recognition, Jun. 27-Jul. 2, 2004, pp. II-506 to II-513.
Lepsøy et al., "Statistical Modelling of Outliers for Fast Visual Search," IEEE International Conference on Multimedia and Expo, Jul. 11-15, 2011, Barcelona, pp. 1-6.
Malaguti et al., "Toward compressed 3D descriptors," 2012 Second Joint 3DIM/3DPVT Conference: 3D Imaging, Modeling, Processing, Visualization & Transmission, pp. 176-183.
Narozny et al., "ICA based algorithms for computing optimal 1-D linear block transforms in variable high-rate source coding," Signal Process, Elsevier, 2008, 88(2), pp. 268-283.
Nistér et al., "Scalable Recognition with a Vocabulary Tree," IEEE Computer Society Conference on Computer Vision and Pattern Recognition, 2006, pp. 2161-2168.
Papadakis et al., "3D object retrieval using an efficient and compact hybrid shape descriptor," Eurographics Workshop on 3D Object Retrieval, 2008, 8 pages.
Papakostas et al., "An efficient feature extraction methodology for computer vision applications using wavelet compressed Zernike moments," ICGST International Journal on Graphics, Vision and Image Processing, Special Issue: Wavelets and Their Applications SI1 (2005): 5-15.
Pau, "Status on UBC's SIFT patent," STMicroelectronics, International Organisation for Standardisation Coding of Moving Pictures and Audio, ISO/IEC JTC1/SC29/WG11 MPEG2012/m23564, Feb. 2012, San Jose, USA, 10 pages.
Renesas Electronics, "Automotive," webpage, retrieved from http://renesas.com/applications/automotive/ on Mar. 18, 2015, 2 pages.
Reznik et al., "Fast Quantization and Matching of Histogram-Based Image Features," *Proc. SPIE 7798*, Applications of Digital Image Processing XXXIII, 77980L, Sep. 7, 2010, 14 pages.

(56) References Cited

OTHER PUBLICATIONS

Takacs et al., "Outdoors Augmented Reality on Mobile Phone using Loxel-Based Visual Feature Organization," Proceedings of the 1$^{st}$ ACM International Conference on Multimedia Information Retrieval, 2008, pp. 427-434.

Tombari et al., "Unique Signatures of Histograms for Local Surface Description," Proceedings of the 11$^{th}$ European Conference on Computer Vision, Sep. 5-11, 2010, Crete, Greece, pp. 356-369.

Tombari et al., "A combined texture-shape descriptor for enhanced 3D feature matching," 18$^{th}$ IEEE International Conference on Image Processing, Sep. 11-14, 2011, Brussels, pp. 809-812.

Torralba et al., "Small Codes and Large Image Databases for Recognition," IEEE Conference on Computer Vision and Pattern Recognition, 2008, pp. 1-8.

Viola et al., "Rapid Object Detection using a Boosted Cascade of Simple Features," Accepted Conference on Computer Vision and Pattern Recognition, 2001, 9 pages.

VLFeat homepage, retrieved from http://vlfeat.org/, on Mar. 18, 2015, 2 pages.

Weiss et al., "Spectral Hashing," from *Advances in Neural Information Processing Systems 21*, 2008, 8 pages.

Winder et al., "Picking the best DAISY," IEEE Conference on Computer Vision and Pattern Recognition, Jun. 20-25, 2009, Miami, FL, pp. 178-185.

Yang et al., "Evaluating Bag-of-Visual-Words Representations in Scene Classification," Proceedings of the International Workshop on Multimedia information Retrieval, Sep. 2007, pp. 197-206.

Yeo et al., "Rate-efficient visual correspondences using random projections," 15$^{th}$ IEEE International Conference on Image Processing, Oct. 12-15, 2008, San Diego, CA, pp. 217-220.

\* cited by examiner

VISUAL SEARCH SYSTEM ARCHITECTURES BASED ON COMPRESSED OR COMPACT FEATURE DESCRIPTORS

PRIORITY CLAIM

This application claims priority to U.S. Provisional Patent Application Nos. 61/596,149, 61/596,111, and 61/596,142 all filed on Feb. 7, 2012 and each of which is incorporated herein by reference.

TECHNICAL FIELD

Embodiments of the present disclosure relate generally to visual search systems and, more specifically to visual search system architectures that operate within the bandwidth restrictions of various components contained in the system and in a variety of different system applications, such as object detection and navigation in automotive systems and object detection and recognition in surveillance systems.

BACKGROUND

The widespread use of mobile devices equipped with high resolution cameras is increasingly pushing computer vision applications within mobile scenarios. A common paradigm is represented by a user taking a picture of the surroundings with a mobile device to obtain informative feedback on its content. This is the case, e.g., in mobile shopping, where a user can shop just by taking pictures of products, or landmark recognition for ease of visiting places of interest. As in the aforementioned scenarios visual search needs to be typically performed over a large image database. Therefore, applications communicate wirelessly with a remote server to send visual information and receive informative feedback. As a result, a constraint is set by the bandwidth of the communication channel, whose use ought to be carefully optimized to bound communication costs and network latency. For this reason, compact but informative image representation is typically in the form of a set of local compact feature descriptors (e.g. scale-invariant feature transform (SIFT), speeded up robust features (SURF), etc.) that are extracted from the image and that must be subsequently communicated and processed. These descriptors will be alternatively referred to as "compact descriptors" or "compact feature descriptors herein." Improved architectures for implementing visual search systems are needed for various applications, such as object detection and navigation in automotive systems and object detection and recognition in surveillance systems.

SUMMARY

An embodiment of a visual search system includes at least one imaging device, each imaging device operable to capture a corresponding image. A feature extraction device is coupled to each imaging device and each feature extraction device is operable to generate feature descriptors from the image received from the corresponding imaging device. A descriptor encoding device is coupled to each feature extraction device and is operable to generate compressed feature descriptors from the received feature descriptors. An application processor is coupled to each descriptor encoding device. The application processor is operable to process the received compressed feature descriptors to generate output information as a function of the processed compressed feature descriptors.

DETAILED DESCRIPTION

Body design of modern and future vehicles will challenge the driver who has to deal with reduced direct visibility. For example, when driving the car at low speed to park it, the driver should be able to visually detect what objects or people are around the vehicle and evaluate the relative distances since maneuvering the car might collide with them, which may result in unacceptable injuries and/or costly damages.

One efficient solution to this issue is to install multiple "satellite" cameras (usually four attached to a powerful application processor on the car periphery to cover 360 degrees of the space around the car. The cameras send their video signals to a central application processor or electronic control unit (ECU) that generates an aggregated 360 degree view displayed on a dashboard screen of the car, thus contributing to the driver's situational awareness. These types of applications have been on the market since 2009.

On top of the 360 degree surround image on the screen, machine vision assisted detection of obstacles, associated with warnings to the driver of potential dangers during low-speed maneuvers, can further increase the driver's situational awareness and reduce the risk of collisions. Automotive manufactures target this enhancement on new models of vehicles to be put on the market in the coming years (starting since 2013) by incrementally lowering the cost of the initial solutions and increasing the features available to cover an increasing number of use cases.

Figure 6:
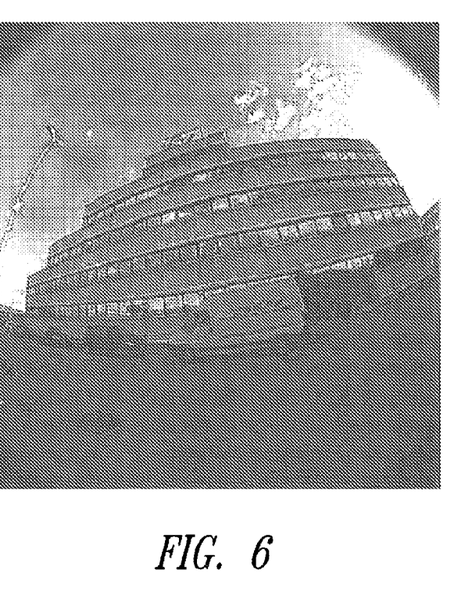
FIG. 6 is a sample of an image captured with a fish eye lens.

In order to minimize the system cost and thus the number of cameras to cover the whole 360 degree space and, due to the constraints of their physical placement, very wide lenses have to be used on each of the four cameras, typically above 180 degree of effective horizontal Angle of View (AOV). For practical reasons, such lenses use near equidistant projection mapping and are called, due to their appearance, "fisheye lenses". Being the opposite of rectilinear lenses, the images projected by fisheye lenses on the image plane appear "stretched" in the center and compressed toward the border of the projected circle. FIG. 6 is a sample of an image captured with a fish eye lens. A solution could be to "undistort" the fisheye images to fall back into the rectilinear case but this solution affects and degrades the image gradient distribution as captured by the sensor, and it would require too costly hardware and frame buffering in the camera.

Presently, landmarks and buildings taken with rectilinear lenses represent the largest number of images for compact feature descriptors for visual search (CDVS) datasets which are the closest in term of "objects captured on the road" to automotive related use cases. Unfortunately no fish eye images have been used during the development of these CDVS studies.

Consequently, in order to consider a potential application of the CDVS standard into the automotive context, the fact of using fish eye optics (i.e., a fish eye lens) has to be considered and taken into account for upcoming development.

A satellite camera connection with a central ECU can be wired or wireless. With original equipment manufacturer (OEM) car makers, wired connection is clearly preferred, while wireless remains interesting for potential after-market solutions. Initially, wired systems used analog video transmission (e.g., composite video, with blacking and sound (CVBS)) transmitted over coaxial or shielded twisted pair (STP) cabling, associated with controller area network (CAN) cables for camera control. In order to improve the overall quality of the partial video signals received by the central ECU, as well as for cabling simplification, proprietary digital serial link semiconductor products (i.e., a pair of serializer and deserializer chips per camera position) have enabled digital camera solutions, while removing the resolution limitation previously imposed by national television system committee (NTSC) or phase alternating line (PAL) analog video standards. These solutions provide enough bandwidth to transmit uncompressed video as well as camera control in the same STP cable. However, there is no standard on the market.

The race for cost efficiency as well as car architecture simplification to bring reliability benefits motivates the automotive industry to look for cheaper and simpler solutions. One important contributor to system cost is the cabling, and another one is the multiplication of dedicated systems. In the past few years, a new trend of larger adoption of Ethernet technologies in vehicles has been observed. Physical layer automotive grade-qualified semiconductor products allowing the use of cheap unshielded twisted pair (UTP) cabling have become available. The use of UTP cabling brings further cost benefits as it can be integrated into the cable harnesses of a vehicle and take advantage of cheap multi-pole connectors, as opposed to expensive separate connectors for shielded or coaxial cables. However, to benefit from UTP cabling, the cabling must intrinsically ensure the electromagnet compatibility through low emissions and low susceptibility to being disturbed by induced parasitic signals. This is strongly related to the frequency that determines data bandwidth of a link including UTP cabling. The current solution of physical layer compatibility with Ethernet protocols and complying with electromagnetic compatibility (EMC) standards while using UTP cabling is limited to 100 Mbps. To further reduce the overall system cost, an Ethernet network installed in a car is intended to be shared by several subsystems, such as 360 degree cameras, infotainment devices, diagnostics devices, and so on. The limited data throughput of such networks that at later point may even need to be shared among several sub-systems will further increase the requirement for large data sources, such as cameras, to compress their output data.

Video data compression such as through motion JPEG (MJPEG) or H.264 compression is lossy, hence reducing the video quality received at the ECU. While that quality decrease may not be noticeable to human perception in the displayed images, it may substantially affect the operation of feature extraction algorithms that may require high quality video not affected by encode/decode processes that cause loss of information, artifacts and alteration of gradient distributions. For this reason, it is recommended that those stages or processes of video analytics requiring high quality video, such as interest point detection and visual compact feature descriptor generation, be implemented on the video being acquired by the image sensor prior to any H.264 or high efficiency video coding (HEVC) encoding. The data streams produced by these stages should be standardized in terms of structure and transmission such that the upper stages of the video analytics residing in the central ECU can receive and correctly interpret it. Also, to be compatible with future systems, the amount of the compact feature descriptor data should be kept low enough to allow system operation over 100 Mbps links shared by several sources, which in practice may allow as little as about 10 Mbps per camera. Any means adopted to reach this goal further needs to be flexible such that lower compressions and hence higher performance can be reached if more data throughput is available. Ideally, camera intrinsic properties, such as the optics used, should create as few dependencies to central ECU as possible. It would be reasonable to require that the stages of video analytics eventually implemented at the camera level, do not create any such dependencies. For example, if interest point detection and its descriptor generation and compression all shall reside in the camera, then the correct operation of these processes should be ensured by the camera itself whatever the optics, sensors, or other components of the camera may happened to be, and without the need for the ECU to intervene at this level.

This new scenario suggests that existing requirements defined by compact descriptors for visual search (CDVS) have to be complemented with new ones suitable for embedded implementation in order to enable its future application to the automotive context or environment.

Figure 1:
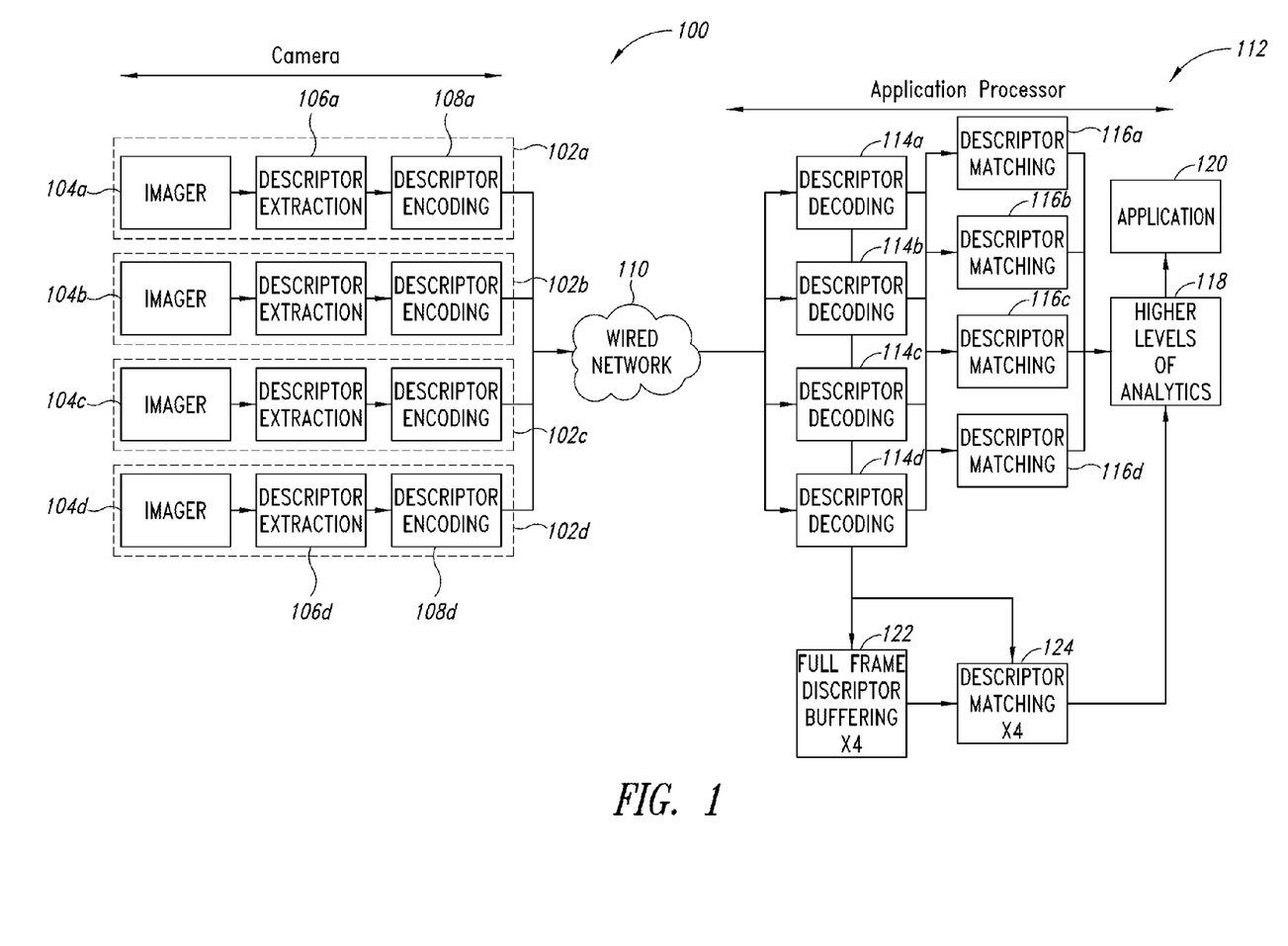
FIG. 1 is a functional block diagram of a 360-degree automotive visual search system according to one embodiment.

FIG. 1 is a functional block diagram of a 360-degree automotive visual search system 100 according to one embodiment of the present disclosure. In the embodiment of FIG. 1 a number of imaging devices or cameras 102a-d, four in this embodiment, which are put around the car (not shown) and each of them includes an imager 104a-d that captures digital images, and a descriptor extraction circuit 106a-d and descriptor encoding circuit 108a-d that are operable at full frame rate to generate feature descriptors extracted from the captured digital images and to encode and compress these feature descriptors to generate compact feature descriptors, respectively. These compact feature descriptors are communicated over a wired network 110 to an electronic control unit (ECU) or application processor 112. The application processor 112 performs pair wise matching between camera views and tracking within the same camera view in order to feed higher level analytics processing, such as Structure from motion (SfM) and Simultaneous Localization and Mapping (SLAM). Accordingly, as shown in FIG. 1 the application processor 112 includes parallel-connected descriptor decoding circuits 114a-d that receive the encoded visual compact feature descriptors from the descriptor encoding circuits 108a-d. The descriptor decoding circuits 114a-d decode these encoded compact feature descriptors and provide the decoded descriptors to descriptor matching circuits 116a-d that utilize these decoded feature descriptors to perform descriptor matching among multiple captured images. The descriptor matching circuits 116a-d output matching information to a higher level analytics circuit 118 which performs higher level analysis of these matches, such as through SfM and SLAM as previously mentioned. The higher level analytics circuit 118 outputs higher level analytics information to an application circuit 120 that utilizes this information to perform, for example, machine vision assisted detection of obstacles, provide driver warnings of potential dangers, and so on. The application processor 112 also may include buffer circuits 122 and 124 for buffering decoded visual compact feature descriptors from the circuits 114 and descriptor matching information from the circuits 116, respectively.

Figure 2:
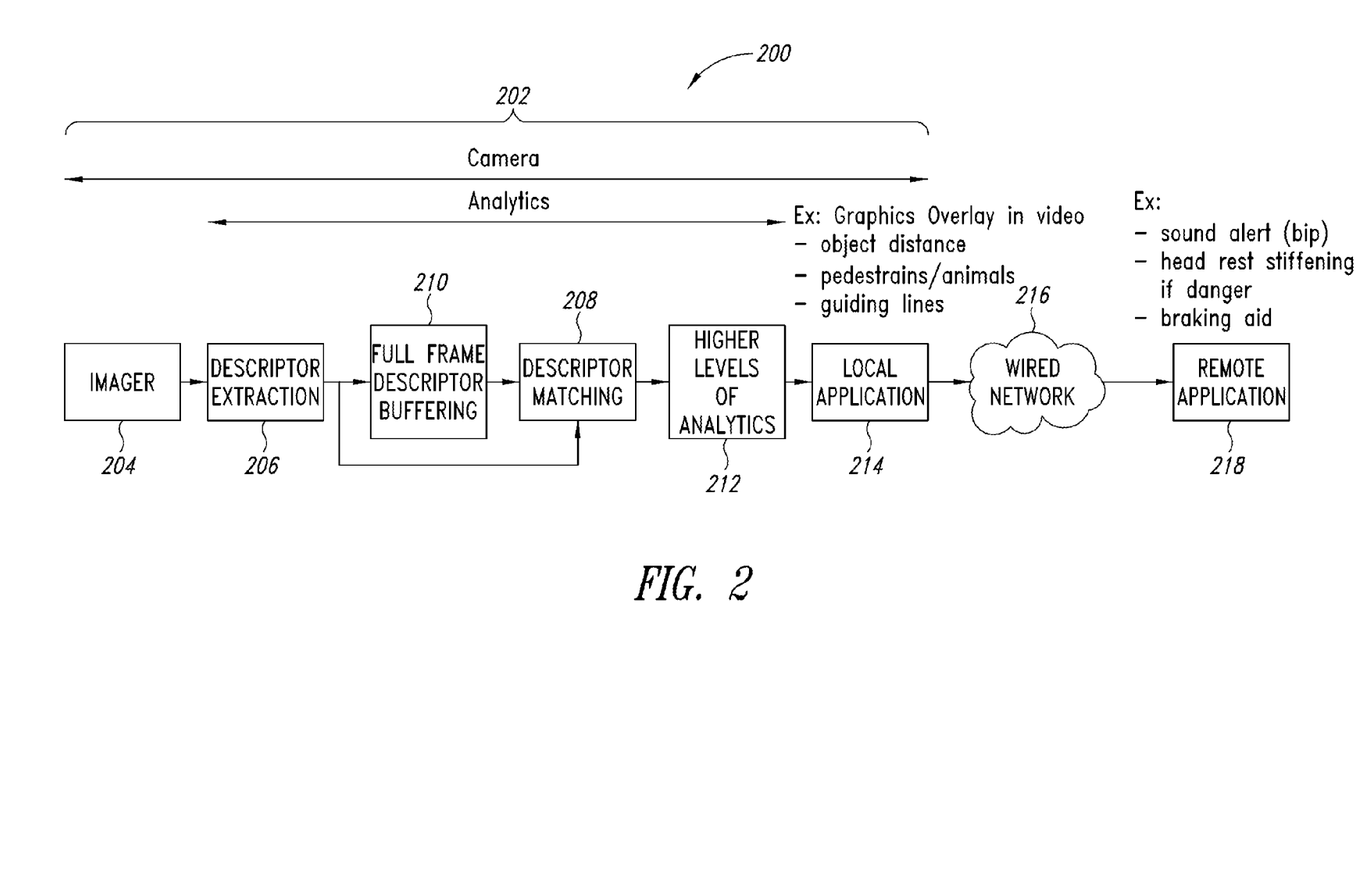
FIG. 2 is a functional block diagram of a rear-view automotive visual search system according to another embodiment.

FIG. 2 is a functional block diagram of a rear-view automotive visual search system 200 according to another embodiment of the present disclosure. FIG. 2 is particularly interesting because it is related to a smart rear camera application that suggests the need for uncompressed visual descriptors to feed the descriptor matching stage that is performing temporal tracking in order to feed higher level analytics processing as explained previously. These higher levels can be partially implemented on the camera side (i.e., left side of FIG. 2) and partially on the remote application processor side (i.e., right side of FIG. 2). In this case, a descriptor extraction stage is still needed but not a descriptor compression stage because the extracted visual descriptors are not compressed. Consequently, this application is an example of the need to decouple the description or descriptor extraction stage from the descriptor encoding or compression stage and in this illustrates the need for a separability requirement, meaning separation of the extraction and compression functionality.

In the embodiment of FIG. 2, an imaging device or camera 202 includes an imager circuit 204 that captures digital images and outputs these digital images to a descriptor extraction circuit 206. The descriptor extraction circuit 206 operates as previously described for the descriptor extraction circuits 106 of FIG. 1 to extract visual descriptors from the capture digital images and output these visual descriptors to a descriptor matching circuit 208. A descriptor buffering circuit 210 may be coupled between the descriptor extraction circuit 206 and descriptor matching circuit 208 to buffer as necessary the visual descriptors from the descriptor extraction circuit for each frame or image captured by the imager circuit 204. The descriptor matching circuit 208 matches descriptors between frames are images and outputs matching information to a higher level analytics component 212 which, as described above with reference to FIG. 1, performs higher level analytics processing using this matching information.

The analytics component 212 and local application circuitry 214 in the camera 202 operate to generate desired information to be communicated to a driver of the vehicle containing system 200. This information may include graphics overlay information in the video being supplied to the driver, where such graphics overlay information could include distance to an object present in the digital imager captured by the imager circuit 204, identification of pedestrians and or animals in the images, and guiding lines for utilization by the driver in guiding the vehicle. This information is communicated by the local application circuitry 214 over a wired communications network 216 to remote application circuitry 218 in the vehicle. The remote application circuitry 218 may include a visual display for displaying information to the driver, audio circuitry for providing audible information such as an alert or beep to get the driver's attention, and may also include circuitry that activates the brakes of the vehicle or controls safety-related equipment in the vehicle such as safety restraints and equipment like headrests that may have controllable characteristics like stiffness that could be adjusted to protect the driver if a dangerous condition is detected.

Figure 3:
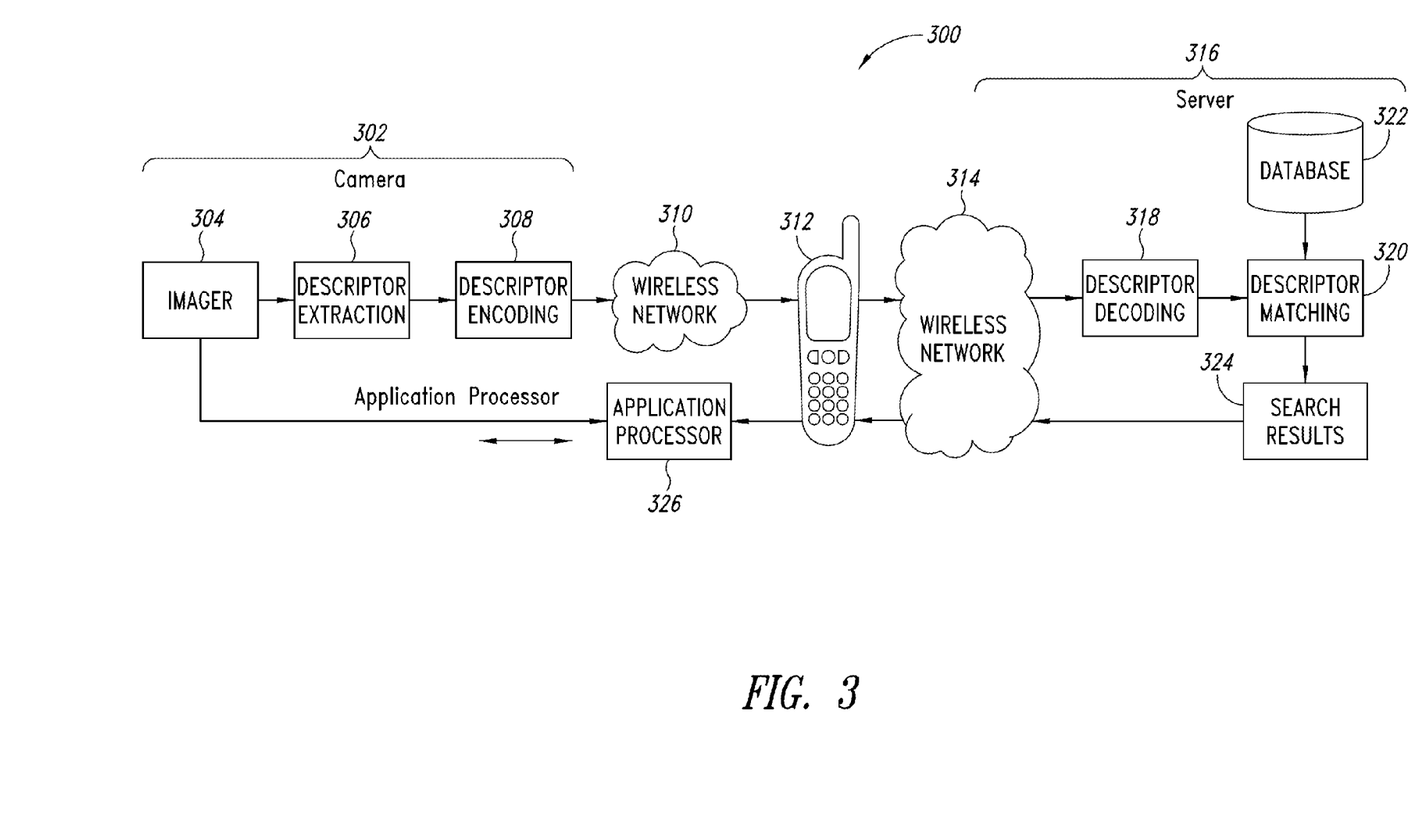
FIG. 3 is a functional block diagram of an augmented automotive visual search system according to a further embodiment.

FIG. 3 is a functional block diagram of an augmented automotive visual search system 300 according to a further embodiment. In this case a camera 302 includes imager circuitry 304 that captures digital images along with descriptor extraction circuitry 306 that extracts visual descriptor from the captured digital images. The extracted visual descriptors are provided to descriptor encoding circuitry 308 that encodes and compresses these visual descriptors for transmission over a wireless network 310. The wireless network is any suitable wireless protocol, such as WiFi or Bluetooth that may communicate with a conventional smartphone 312, which functions effectively as a 3G or 4G modem to stream the compressed compact feature descriptor data over a suitable wireless network 314, such as a 3G or 4G cellular network, to a server 316. The server 316 includes descriptor decoding circuitry 318 and descriptor matching circuitry 320 that operate as previously described for corresponding components in FIGS. 1 and 2. The server 316 also includes a database 322 that stores images that are matched based at least in part on feature descriptors from the descriptor encoding circuitry 318 and matching information from the descriptor matching circuitry 320. Search results circuitry 324 compiles search results generated from a search of the database 322 using the information from the circuitry 318, 320 and communicates these search results over the wireless network 314 to the smartphone 312. These search results may include retrieval and encoding of augmented graphics content via MPEG 3D Graphics Coding, and these results are sent via the network 314 to an application processor 326. The application processor 326 mixes and displays or "augments" the search results, meaning, for example, the application processor supplies the retrieved image from database 322 to the imager circuitry 304 for display to the user and also provides additional information, perhaps in the form of descriptive text, that is superimposed on the displayed image to supplement or "augment" the retrieved image. For example, if the image is of particular building text identifying the name and address of the building may be supplied in the displayed image on the imager cirvcuitry 304. In this way, the embodiment of FIG. 3 enables augmented reality applications by using MPEG Augmented Reality Application Format, for example.

In surveillance system embodiments, a standalone fixed position camera "watches" or captures images of its surrounding environment based upon the location and orientation of the camera. A battery powered camera, due to power consumption constraints, cannot simply send the captured video frames to remote location for viewing or recording, so as a result the camera has to integrate basic capabilities to extract interest points in the captured digital images, generate feature descriptors for the extracted interest points, and then compact or compress the feature descriptors for each captured digital image for communication to the remote location.

Connectivity to the camera in such applications can be, for example, through Ethernet, WiFi, or Zigbee (IEEE 802.15.4) communications links. The bandwidth limitations of this communications link is paired with possible discontinuity in service (i.e., a variable Quality of Service (QoS)) and/or different imposed levels of quality of the communicated information captured by the camera to reduce latencies (i.e., variable Quality of Experience (QoE)). The security market is split into several fragments, most of them using industry standard technologies for camera video transmission and control.

Consumer or "Prosumer" Internet Protocol (IP) cameras complete the traditional expensive video surveillance camera market that is itself undergoing a transition from traditional analog cameras like closed circuit television (CCTV) cameras connected via coaxial cabling to digital IP cameras that are connected via STP cabling, accompanied with a cost and price decrease. As for the new fast-growing market of small and cheap consumer/prosumer IP cameras, they use Ethernet, power line, or wireless transmission following consumer electronics and IT industry standards such as 100/1000Base-Tx, BPL (Broadband over Power Line), WiFi a/b/g/n.

Some market sub-segments such as Intruder Alarm Systems (IAS) adopt non-standard or less popular standard wireless technologies as there are strong battery life constraints.

A large portion of consumer/prosumer wireless cameras are also battery-powered for the sake of ease of installation or/and mobility, but their autonomy does not need to last for years as opposed to the use of such cameras as IAS detectors.

There are two common denominators to the large variety of security-related camera systems: 1) ever-increasing use of the Internet; and 2) the need for storage for the captured video footage. These set specific constraints in terms of data rate that the transmitted video needs to pass through the bottleneck of the transport chain, usually situated somewhere in the Internet path, as well as the amount of data to store which determines the amount and cost of storage to install.

In general practice, the captured video needs to be compressed and further intelligence is required to generate alerts, trigger alarms or/and select relevant video to store, which reduces the amount of the required storage, the amount of video to transfer and provides means for speeding up the video search based on computer generated metadata.

Due to the need for strong video compression, the quality of the video received at central equipment level, whether local or distant, is reduced, which potentially creates the need of integration of video quality sensitive stages of video analytics in the camera end. For wired cameras that can stream continuously, the remaining part of the video analytics can reside in central equipment. The definition of a standard way of interfacing between the analytics stages in the camera and central equipment is of great interest.

In other cases, such as battery-powered surveillance cameras or camera-fitted IAS detectors, a higher degree of video analytics is required to reside directly in the camera in order to detect relevant events and only stream relevant video, generate relevant alerts or/and trigger relevant alarms. These devices may need different standards but will not benefit from a standard targeting the split of analytics stages between camera and central equipment based on the criterion of video quality. In this case description stage is still needed at camera side but not the compression one, similarly as shown in FIG. 2. Consequently there is the need to decouple the description stage from the compression one, suggesting the need for a separability requirement as previously mentioned above.

Figure 4:
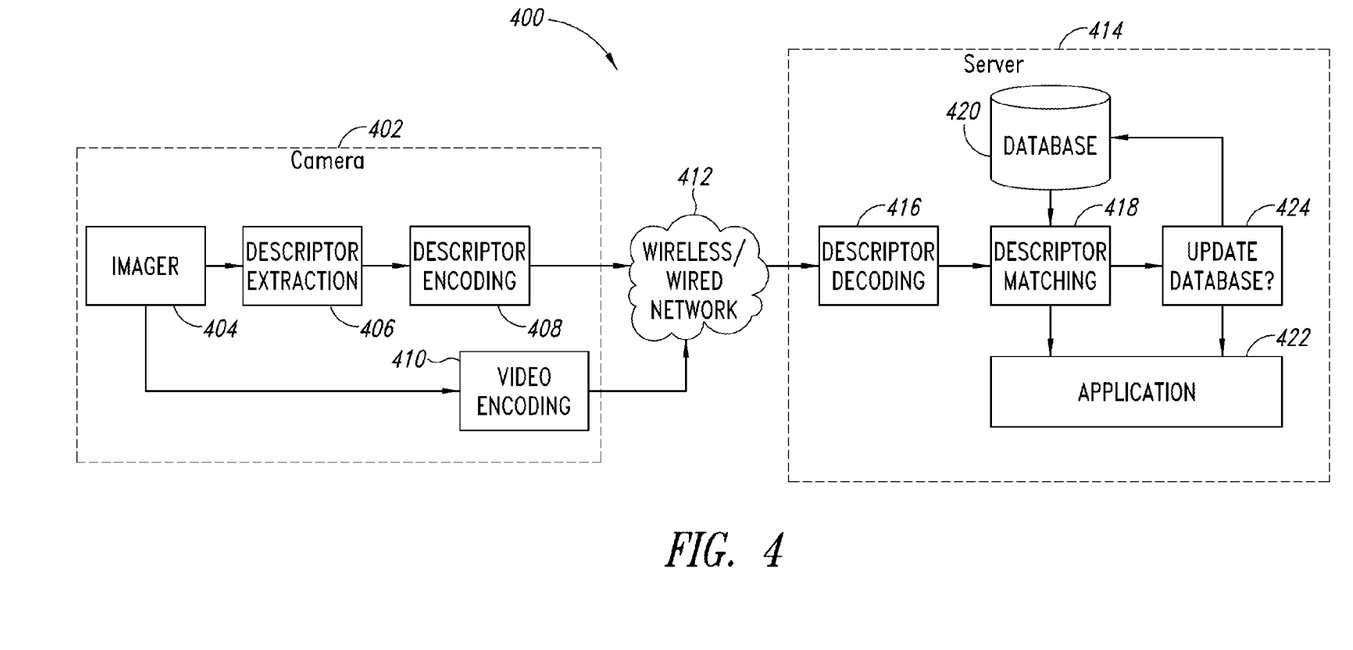
FIG. 4 is a functional block diagram of a surveillance visual search system according to one embodiment.

As previously explained, strong video compression requirements implies that a wired camera sends compact feature descriptors to central equipment and then the remote system does some visual search to, for example, recognize objects and generate alerts, as shown on FIG. 4. A cable powered IP camera, wired or wireless, may stream at all timesand therefore since the IP camera acquires video images these images must be compressed to be transmitted via the wireless or Ethernet connection. FIG. 4 is a functional block diagram of a surveillance visual search system 400 according to another embodiment of the present disclosure. In this embodiment, a camera 402 includes an imager 404 that captures digital images and a descriptor extraction circuit 406 that generates feature descriptors extracted from the captured digital images. These feature descriptors are provided to a descriptor encoding circuit 408 that encodes and compresses the feature descriptors to generate compact feature descriptors. The camera 402 also includes a video encoding circuit 410 that encodes and compresses the captured video images for subsequent transmission, along with the compact feature descriptors, over a wired or wireless network 412. In this way the video encoding circuitry 410 compresses the captured video and streams this compressed video over the network 412.

The compressed video from the encoding circuitry 410 and compact feature descriptors extracted from this video are communicated over the network 412 to a server 414. In the server 414, a descriptor decoding circuit 416 decodes the received encoded compact feature descriptors and provides the decoded feature descriptors to a descriptor matching circuit 418. The matching circuit 418 performs descriptor matching using the decoded feature descriptors and operates in combination with a database 420 and application circuitry 422 to perform some type of visual search function based on the descriptor matching, such as to perform object recognition and generate alerts. The server 414 also decodes and processes in some way, such as by displaying for viewing or storing, the received encoded video from the vidie encoding circuitry 410.

Figure 5:
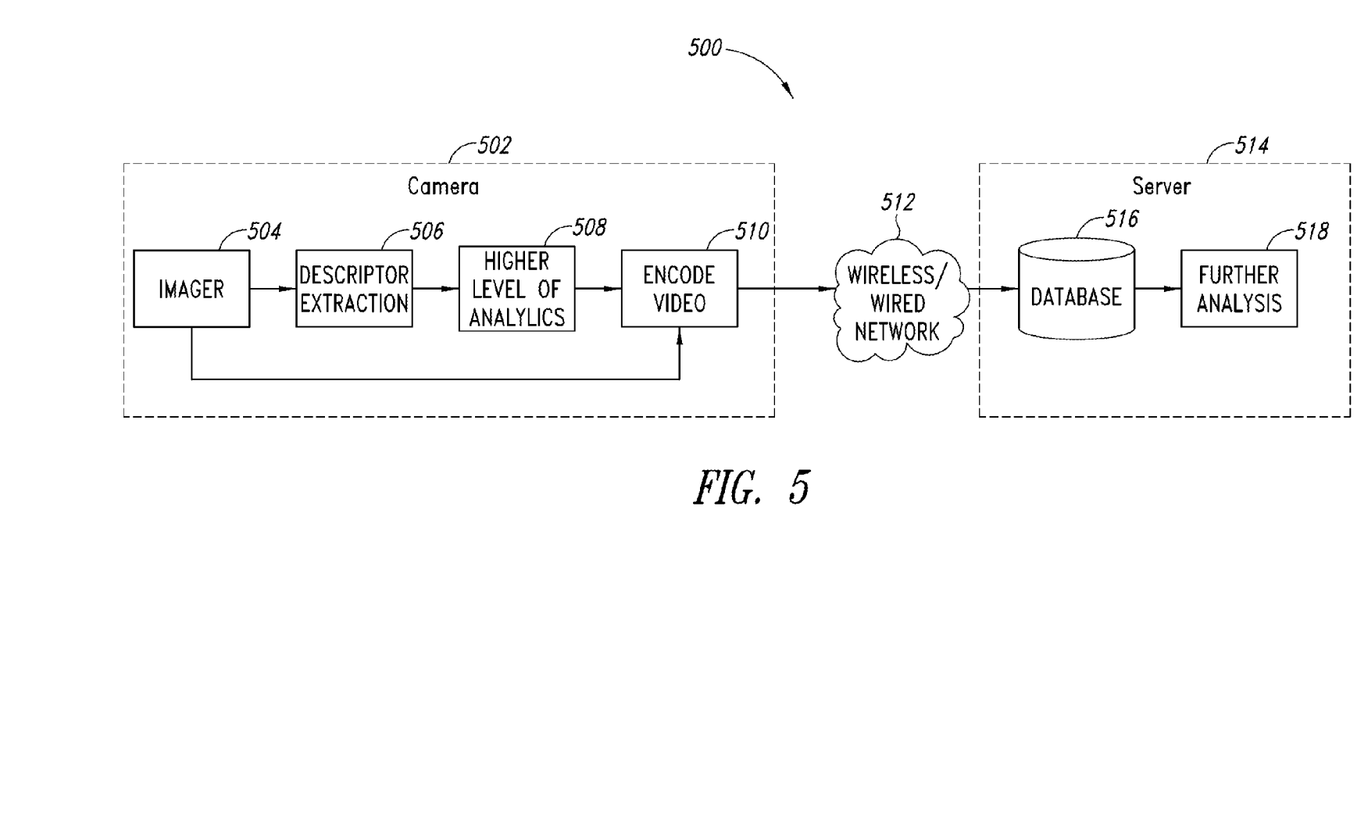
FIG. 5 is a functional block diagram of a surveillance visual search system according to a further embodiment.

Battery-powered surveillance cameras or camera-fitted IAS detectors will, instead of streaming video continuously as with the imager circuit 404 and video encoding circuitry 410 of FIG. 4, only stream video if a relevant event is detected. Relevent events are detected through feature detection and higher level analytics without requiring any compression of the feature descriptors and thus any compression stage. FIG. 5 is a functional block diagram of a surveillance visual search system 500 according to such a further embodiment. In this embodiment, a camera 502 includes an imager 504 that captures digital images and a descriptor extraction circuit 506 that generates feature descriptors extracted from these captured digital images. These feature descriptors are provided to higher level analytics circuitry 508 that processes the feature descriptors, including performing feature detection, to generate information that controls the operation of the system 500. As mentioned above, in an IAS or surveillance system, such as the system 500, the camera 502 only streams video when a relevant event is detected. This detection is performed by the higher level analytics circuitry 508. When such an event or other pertinent information is detected by the higher level analytics circuitry 508, the video captured by the imager 504 is encoded by video encoding circuitry 510 and output over a wired or wireless network 512 to a server 514. The server 514 includes a database 516 and supplemental analysis circuitry 518 that may include circuitry for decoding and the received encoded video data and displaying the decoded video, and as well as analytics circuitry that may operate in combination with the database 516 to further process the video.

Figure 7:
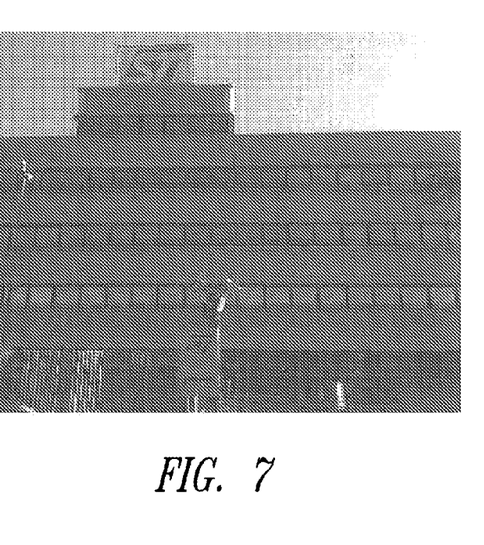
FIG. 7 is an example of an image captured with a camera contained in a conventional smartphone.

In an example a building is captured with both fish eye lens (FIG. 6) and the camera of Nokia XpressMusic 5800 smartphone (FIG. 7). FIG. 6 is a sample image of the building captured with a fish eye lens while FIG. 7 is an example image of the building captured with a camera contained in a conventional smartphone, such as the Nokia XpressMusic 5800.

In relation to feature descriptor extraction, many different feature descriptors have been proposed, with one of the most common being the scale-invariant feature transform (SIFT). SIFT descriptors provide two distinct main phases: 1) keypoints detection, which significant image points that are invariant to scale and rotation; and 2) descriptor extraction, where in the neighborhood of each keypoint information about the gradient is recorded.

Regarding scale-space extrema detection, in order to search all potential keypoints, first you have to look for points that are invariant under changes of scale. This is done by searching extrema in the Difference-of-Gaussian (DoG) function convolved with the image. For keypoint localization, each point found in the previous phase, a determination of the interpolated location of each extrema is made with a method based on Taylor expansion. All extrema with a value of |D(x)| less than a threshold are discarded, because they are extrema with low contrast. The Difference-of-Gaussian (DoG) will have a strong response along edges, even if the location along the edge is poorly determined. So the keypoints with a ratio between a principal curvature less than a threshold are discarded. This may be done in a very efficient way using the Hessian matrix, as appreciated by those skilled in the art.

Regarding orientation assignment, in order to achieve invariance to image rotation, a consistent orientation is assigned to each keypoint, so it can be represented relative to this orientation. The orientation is assigned selecting the highest peak in the histogram of gradient, calculated within a region around the keypoint. For locations with multiple peaks of similar magnitude, there will be multiple keypoints with different orientation.

In relation to keypoint descriptors, after keypoint detection and orientation assignment, descriptors can be extracted. These are obtained by sampling magnitude and orientation of the gradient in a neighborhood of the keypoint. In order to achieve orientation invariance coordinates and gradient orientation are rotated relative to the keypoint orientation. To avoid sudden changes in the descriptor with small changes in the position of the window, a Gaussian weighting function is used to assign a weight to the magnitude of each sample point, depending on the distance from the keypoint. The descriptor consists of a set of histograms of orientation calculated over regions of 4×4 with 8 orientation bins. Finally, the vector representing the descriptor is normalized to be invariant to changes in lighting.

For descriptor matching, the best candidate match for each keypoint is its nearest neighbor in the database. The nearest neighbor is defined as the keypoint with minimum Euclidean distance. To discard features that do not have any good match to the database there is a threshold on the ratio of distance from the first and second closest neighbors. For fixed length encoding, thresholding: in this phase we set to 0 each value that are less than a threshold (e.g. 0.01). This has a very little impact on descriptor performance.

For run length encoding, the analysis of the SIFT descriptors to find out the descriptors' values distribution, and in particular the number of values less than a threshold. Table 1 below shows the results.

| Threshold | Average zero count | Percentage |
|---|---|---|
| 0.1 | 105,152 | 82.15% |
| 0.01 | 52,890 | 41.32% |
| 0.001 | 27,191 | 21.24% |
| 0.0001 | 27,191 | 21.24% |
| 0 | 27,191 | 21.24% |

As seen in Table 1, the percentage of zero values inside the SIFT descriptor is such that run-length encoding (RLE) of the SIFT descriptors is applicable or would be effective. Run-length encoding (RLE) is a very simple form of data compression in which runs of 0 data (that is, sequences in which the 0 data value occurs in many consecutive data elements) are stored as a single data value and count, rather than as the original run of data values, as will be appreciated by those skilled in the art. For example, consider a vector containing many zero values and values different than 0. There will be many long runs of 0, and many short runs values different than zero. Let us take a hypothetical single vector, with B representing the value different than 0 and many 0:

000000000000B000000000000BBB000000000000000
000000000B00000000000000

If we apply the run-length encoding (RLE) data compression algorithm to the above vector, we get the following: 1201B1203B2401B140. This is to be interpreted as twelve 0s, one B, twelve 0s, three Bs, etc. The run-length code represents the original 67 numbers in only 18.

For variable length encoding, N-bit Quantization: Let P={p1, p2, . . . , pn} be the descriptor after the run length, and Q={q1, q2, . . . , qn} the quantized descriptor. For each value pi we compute the corresponding qi as follow:

$$q_i = \left\lfloor (2^6 - 1) \cdot p_i + \frac{1}{2} \right\rfloor. \qquad 1$$

In this example N=6. For Arithmetic Coding, now there is a descriptor that is a vector of n-bit integers, but more than 70% of these values are equal to 0. We can use this fact to make a lossless compression using adaptive Arithmetic Coding algorithm.

Regarding descriptor decoding, the inverse of arithmetic decoding is applied. For matching in the compressed domain when we use quantization for compressing SIFT descriptors, it is possible to do descriptor matching in the compact domain. If we also apply arithmetic coding we need to decode the compact feature descriptors to obtain the quantized version.

The only difference between each of the values of the quantized descriptors and the decoded descriptors is a scale factor. In fact, $$p'_i = \frac{1}{2^b} \cdot q_i$$

where $p'_i$ is the decoded value, $q_i$ is the quantized value and b is the number of quantization bits. For this reason if the distance is computed between two descriptors in the quantized domain we get a result that is $2^b$ times the distance between the same descriptors in the decoded domain. When, during the descriptor matching, the ratio between the distances of the first and second nearest neighbors is computed we get the same result both in quantized and decoded domain.

Figure 8:
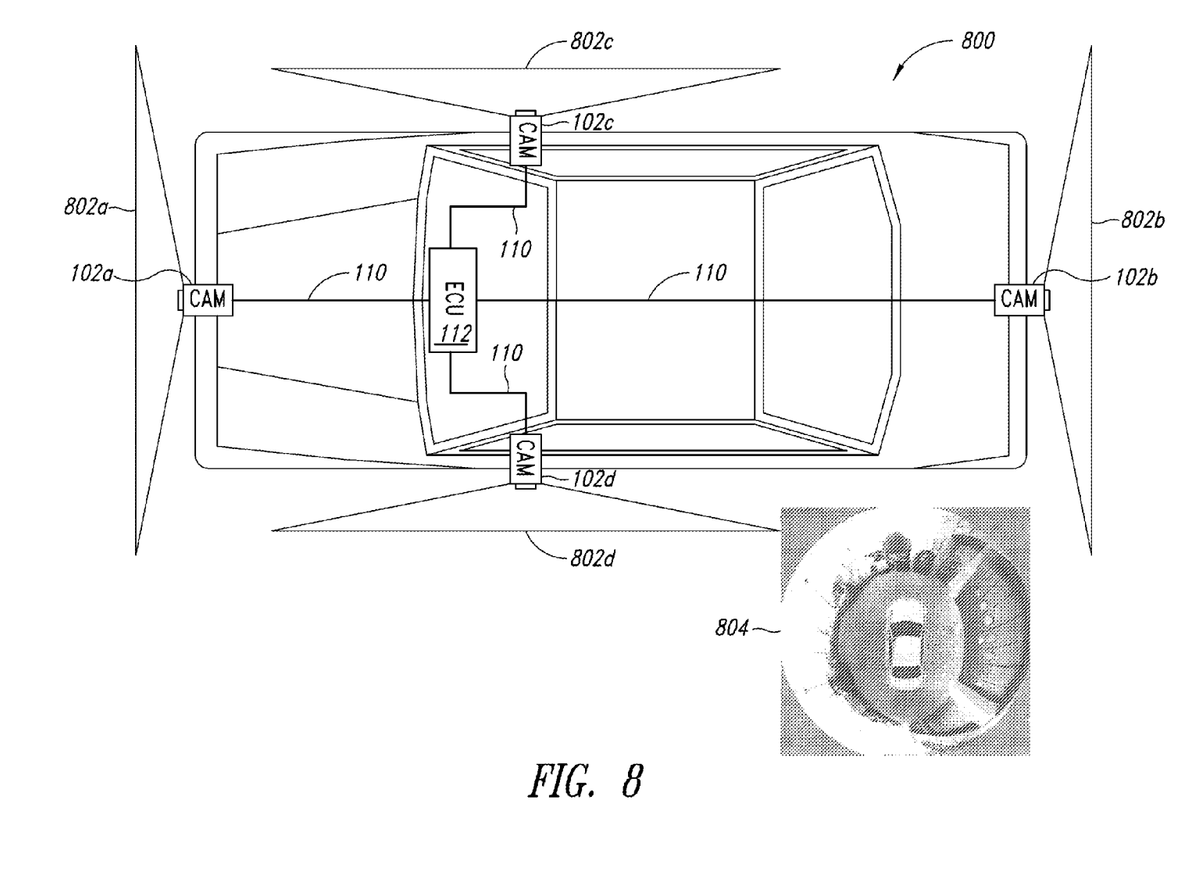
FIG. 8 is a top view of a vehicle including the automotive visual search system of FIG. 1 contained in the vehicle according to one embodiment of the present disclosure.

FIG. 8 is a top view of a vehicle 800 including the automotive visual search system 100 of FIG. 1 contained in the vehicle according to one embodiment of the present disclosure. Each of the four cameras 102a-d is positioned on a corresponding side of the vehicle 800. In the embodiment to FIG. 8, the camera 102a is positioned on the front side of the vehicle 800 to capture images within a field of view (FOV) 802 of this camera. Similarly, the cameras 102b, 102c and 102d have respective fields of view 802b, 802c and 802d and are position on the rear side, right side and left side of the vehicle 800, respectively. Each of the cameras 102a-d is coupled through the wired network 110 to the electronic control unit (ECU) or application processor 112. The cameras 102a-d have suitable lenses (not shown), such as fish eye lenses, which enable the cameras to collectively provide a 360 degree field of view 804 around the vehicle 800, as illustrated in the smaller top view image shown in the lower-right portion of FIG. 8.

One skilled in the art will understand that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. It should also be noted that the functions performed can be combined to be performed by fewer elements or process steps depending upon the actual embodiment being used in the system 100 of FIG. 1. Therefore, the present invention is to be limited only by the appended claims.

What is claimed is:

1. A vehicle visual search system, comprising:
   at least four cameras, each camera configured to be positioned on one side of a vehicle and configured to capture corresponding digital images, each of the cameras comprising:
   a feature descriptor extraction circuit configured to receive the corresponding captured digital images and configured to generate feature descriptors from the captured digital images; and
   a descriptor encoding circuit coupled to the feature descriptor extraction circuit to receive the feature descriptors and configured to generate compact feature descriptors from the feature descriptors wherein the descriptor encoding circuit generates the compact feature descriptors by performing zero-thresholding on the feature descriptors to generate zero-threshold delimited three-dimensional feature descriptors, quantizing the zero-threshold delimited three-dimensional feature descriptors to generate quantized feature descriptors, and coding the quantized feature descriptors to generate the compact feature descriptors; and
   an application processor connected through a wired network to each of the at least four cameras, the application processor configured to receive the compact feature descriptors through the wired network and to process the received compact feature descriptors to generate output information that is utilized in controlling the operation of the vehicle.

2. The vehicle visual search system of claim 1 wherein the compact feature descriptors comprise Scale-Invariant Feature Transform (SIFT) descriptors.

3. The Vehicle visual search system of claim 1 wherein the compact feature descriptors comprise Signature of Histograms of orientations (SHOT) descriptors.

4. The vehicle visual search system of claim 1 wherein the cameras collectively provide a 360 degree field of view around the vehicle.

5. The vehicle visual search system of claim 1 wherein the wired network comprises an Ethernet network.

6. The vehicle visual search system of claim 1 wherein, the application processor configured to process the received compact feature descriptors without decoding the compact feature descriptors to perform matching of the captured digital images.

7. The vehicle visual search system of claim 1 wherein the generated output information comprises textual information presented in a video corresponding to the digital images captured by the cameras.

8. A vehicle visual search system, comprising:
   a plurality of cameras, each camera positioned on one side of a vehicle and configured to capture corresponding digital images, each of the cameras comprising:
   a feature descriptor extraction circuit configured to receive the corresponding captured digital images and configured to generate feature descriptors from the captured digital images;
   a descriptor encoding circuit coupled to the feature descriptor extraction circuit to receive the feature descriptors and configured to generate compact feature descriptors from the feature descriptors, and configured to communicate these compact feature descriptors over a first wireless communications network, wherein the descriptor encoding circuit generates the compact feature descriptors by performing zero-thresholding on the feature descriptors to generate zero-threshold delimited three-dimensional feature descriptors, quantizing the zero-threshold delimited three-dimensional feature descriptors to generate quantized feature descriptors, and coding the quantized feature descriptors to generate the compact feature descriptors;
   a server system configured to receive over a second wireless network the compact feature descriptors and to process the received compact feature descriptors to generate search result information that is then communicated over the second wireless network; and
   a portable electronic device configured to receive the compact feature descriptors over the first wireless network and to communicate these compact feature descriptors over the second wireless network to the server system, and the portable electronic device configured to receive search result information over the second wireless network from the server system and to communicate this search result information over the first wireless network to an application processor, the application processor configured to cause information relating to the search result information to be provided to a person in the vehicle.

9. The vehicle visual search system of claim 8 wherein the compact feature descriptors comprise Scale-Invariant Feature Transform (SIFT) descriptors.

10. The vehicle visual search system of claim 8 wherein the compact feature descriptors comprise Signature of Histograms of Orientations (SHOT) descriptors.

11. The vehicle visual search system of claim 8 wherein the at least one imaging device comprises an application processor that communicates with the imager circuitry to provide search result information to a driver of the vehicle.

12. The vehicle visual search system of claim 8 wherein the portable electronic device comprises a smart phone.

13. The vehicle visual search system of claim 1 wherein the application processor processes the received compact feature descriptors by performing pair wise matching using the received compact feature descriptors from pairs of the cameras and by performing tracking of objects for each camera using the received compact feature descriptors from the camera.

14. The vehicle search system of claim 8 wherein the application processor provides information relating to the search result information to a person in the vehicle by displaying a digital image contained in the search result information.

15. The vehicle search system of claim 14 wherein the application processor further provides additional information to the person in the form of descriptive text that is superimposed on the displayed digital image.

* * * * *